(12) United States Patent
Gut

(10) Patent No.: US 11,926,269 B2
(45) Date of Patent: Mar. 12, 2024

(54) VEHICLE OPERATING SYSTEM

(71) Applicant: DAIMLER AG, Stuttgart (DE)

(72) Inventor: Carsten Gut, Korb (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 742 days.

(21) Appl. No.: 17/049,704

(22) PCT Filed: Mar. 6, 2019

(86) PCT No.: PCT/EP2019/055564
§ 371 (c)(1),
(2) Date: Oct. 22, 2020

(87) PCT Pub. No.: WO2019/206502
PCT Pub. Date: Oct. 31, 2019

(65) Prior Publication Data
US 2021/0237664 A1 Aug. 5, 2021

(30) Foreign Application Priority Data

Apr. 23, 2018 (DE) .................... 10 2018 003 281.8

(51) Int. Cl.
*B60R 16/02* (2006.01)
*B60Q 1/04* (2006.01)
(Continued)

(52) U.S. Cl.
CPC .............. *B60R 16/023* (2013.01); *B60Q 1/04* (2013.01); *G06F 9/445* (2013.01); *G06Q 20/02* (2013.01); *G07C 5/008* (2013.01)

(58) Field of Classification Search
CPC ....... B60R 16/023; B60R 16/037; B60Q 1/04; B60Q 1/085; B60Q 11/00; B60Q 2900/30;
(Continued)

(56) References Cited

U.S. PATENT DOCUMENTS 7,748,043 B2 6/2010 Knechtel et al.
9,707,913 B1 * 7/2017 Ochiai ................. B60N 2/0248
(Continued)

FOREIGN PATENT DOCUMENTS

CN 1547685 A 11/2004
DE 10022423 A1 11/2001
(Continued)

OTHER PUBLICATIONS

Examination Report created on Apr. 27, 2019 in related/corresponding DE Application No. 10 2018 003 281.8.
(Continued)

*Primary Examiner* — Rodney A Butler
(74) *Attorney, Agent, or Firm* — PATENT PORTFOLIO BUILDERS PLLC

(57) ABSTRACT

A vehicle operating system includes a function memory for storing functions or applications and an interface for emitting set sensor data to the functions or applications. An interface is also included for forwarding control commands generated by the functions or applications to actuators of the vehicle. A memory is provided in which, on the part of the vehicle, set permissible value ranges for the control commands are stored. The interface for forwarding the control commands forwards the control commands only in the framework of the value ranges stored in the memory.

11 Claims, 2 Drawing Sheets

Figure 1:
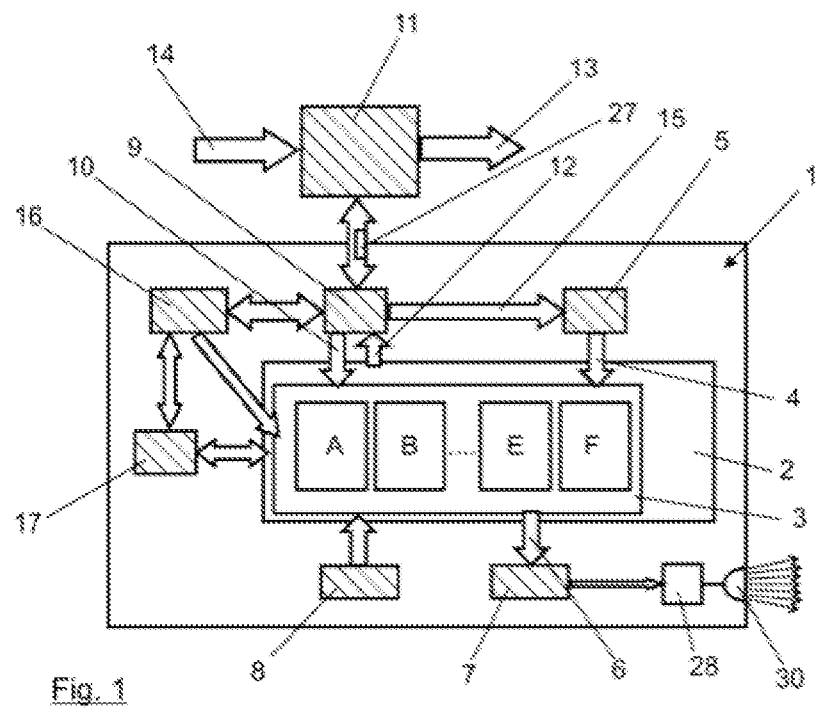

(51) Int. Cl.
*B60R 16/023* (2006.01)
*G06F 9/44* (2018.01)
*G06F 9/445* (2018.01)
*G06Q 20/02* (2012.01)
*G07C 5/00* (2006.01)

(58) Field of Classification Search
CPC ........ G06F 9/445; G06Q 20/02; G07C 5/008; B60W 2050/0006; B60W 2050/0075; B60W 2556/45; B60W 2540/043; B60W 50/0098
See application file for complete search history.

(56) References Cited

U.S. PATENT DOCUMENTS

| | | | |
|---|---|---|---|
| 10,696,208 B2 | 6/2020 | Moisel et al. | |
| 11,059,494 B1* | 7/2021 | Chan ................. | B60W 50/0098 |
| 2004/0054445 A1 | 3/2004 | Vollmer et al. | |
| 2004/0138790 A1 | 7/2004 | Kapolka et al. | |
| 2006/0036356 A1 | 2/2006 | Rasin et al. | |
| 2010/0222939 A1 | 9/2010 | Namburu et al. | |
| 2015/0003087 A1 | 1/2015 | Futamura et al. | |
| 2015/0045988 A1 | 2/2015 | Gusikhin et al. | |
| 2015/0197205 A1 | 7/2015 | Xiong et al. | |
| 2018/0013211 A1* | 1/2018 | Ricci ...................... | G05B 15/02 |

FOREIGN PATENT DOCUMENTS

| | | |
|---|---|---|
| DE | 102004023128 A1 | 12/2005 |
| DE | 102011109720 A1 | 2/2013 |
| DE | 102013006176 A1 | 10/2014 |
| DE | 102016008981 A1 | 1/2018 |
| DE | 102017009725 A1 | 3/2018 |
| JP | 2017206227 A | 11/2017 |
| WO | 2004004203 A1 | 1/2004 |
| WO | 2005003936 A1 | 1/2005 |

OTHER PUBLICATIONS

International Search Report dated Jun. 25, 2019 in related/corresponding International Application No. PCT/EP2019/055564.
Written Opinion dated Jun. 25, 2019 in related/corresponding International Application No. PCT/EP2019/055564.
Office Action dated Feb. 16, 2023 in related/corresponding JP Application No. 201980027493.9.
Office Action dated May 10, 2023 in related/corresponding CN Application No. 201980027493.9.

* cited by examiner

VEHICLE OPERATING SYSTEM

BACKGROUND AND SUMMARY OF THE INVENTION

Exemplary embodiments of the invention relate to a vehicle operating system, and a method for operating a vehicle operating system.

Vehicle operating systems and methods for operating such vehicle operating systems are fundamentally known from the prior art. These vehicle operating systems generally have a function memory for storing functions or applications, which, for their part, control corresponding functionalities in the vehicle. These functions, which commonly relate to aspects of the vehicle relevant to comfort and/or safety, are programmed by the vehicle manufacturer alone in order to reliably comply with the required safety aspects on the condition of the vehicle manufacturer. In practice, this leads to relatively rigid vehicle operating systems, the functions of which often change only very slowly, for example with the market launch of a new vehicle model, such that client requests are only met later or by a different vehicle model. In particular, comfort functions, functions for influencing a multimedia system and similar are thus respectively only accessible for the buyers of the most recent vehicle generation in its most recent version.

DE 10 2011 109 720 A1 describes a method and a system, which comprises the use of a vehicle, dependent on the user, via a communication device. Control data and control commands are transmitted to the vehicle via a communication device such as a smartphone, for example, in order to adjust vehicle functions to the wishes and needs of the user. He/she can thus personalize the vehicle by him/her controlling it via the communication device. If the user carries this communication device with him/her, each vehicle used by him/her, for example in the context of car sharing, is adjusted to correspond to his/her pre-programmed wishes. Here, the problem can lie in that only certain functionalities, such as comfort settings in the vehicle in relation to a multimedia system, a navigation device, position of seats and mirrors etc. for example, can be recorded by the controller. Functionalities that are relevant to the actual driving operation and the driving safety cannot be enabled here, since there is the danger, in principle, that the control commands are used improperly, which constitutes a significant safety risk.

It is further known from DE 10 2016 008 981 A1 that setting the beam pattern of a headlight with a plurality of light sources, for example a pixel headlight, is carried out by means of user presets, for which a comparatively elaborate safety request is achieved using user authentication in order to anticipate the danger of misuse.

Exemplary embodiments of the present invention are directed to a vehicle operating system and a method for operating such a vehicle operating system, which easily and efficiently supports the fast further development of functions and, in doing so, guarantees safe and reliable vehicle functionality.

Sensor data determined by an interface, and preferably fused, is emitted to a function or application in the function memory via the vehicle operating system. This interface can be realized as a defined open interface in order to also make it possible for third-party suppliers, along with the vehicle manufacturer, to develop and program functions and applications for the vehicle. In doing so, a much faster development of new functions and applications can be expected, which can then be distributed much more quickly to various vehicles and the users thereof than before, such that the possibilities for use increase and a client-specific adjustment of each vehicle becomes possible. Finally, this improves the satisfaction of the client and the tangible client benefit.

Control commands, generated by the function or application, in the vehicle operating system are forwarded to actuators of the vehicle via a further—preferably open—interface, the control commands thus controlling the corresponding functions. A memory is provided in which, on the part of the vehicle, permissible value ranges determined by the vehicle manufacturer are stored for the control commands, and the interface for forwarding the control commands forwards these only in the framework of the determined and stored value ranges. In addition to the defined open interface, the permissible value ranges of each can also be defined. In order to nevertheless guarantee the required safety by the vehicle manufacturer, which is their responsibility for the product, it is ensured using the memory for every conceivable control command, which can be described, for example, in a document of the open interface or specified by a permissible value range, that this permissible value range, which, where necessary, can also be influenced by parameters relating to the current state of the vehicle, is not exceeded. Thus, should the application or function want to use an impermissible value range for the control commands, be that due to a programming error or to deliberately harm the vehicle manufacturer or their end clients, then this is prevented by the operating system according to the invention by the value range being curtailed. Thus, situations neither accidentally nor deliberately critical to safety can be triggered by the functions as a result of erroneous or manipulated control commands.

A very advantageous development of the vehicle operating system according to the invention here provides that a communication module is provided to connect the function memory to a backend server. Via such a communication module, for example a GSM module, an at least occasional connection of the vehicle or its operating system to a backend server, in particular a backend server of the vehicle manufacturer, can be achieved. In this manner, functions or applications correspondingly enabled by the vehicle manufacturer, for example, can be downloaded to the function memory of the operating system and correspondingly used by the user of the vehicle.

Here, according to an advantageous development of the idea, a personalization memory can be provided that is connected to the function memory and the communication module and in which it is stored as to which functions or applications are available in the function memory of a person stored in the personalization memory. In doing so, a personalization is possible. The person identifies themselves to the vehicle operating system, be that by means of specific values than can be detected via a sensor, such as weight, height, appearance, which can be correspondingly optically detected or similar. Similarly, it is conceivable to use a corresponding vehicle key with personalized features for the identification or to recognize a mobile device, such as a smartphone or a wearable belonging to the person, for example, which has been registered in the vehicle or the backend server in advance. The vehicle operating system is then able to enable the corresponding data in the personalization memory which functions and, where necessary which parameterization of the functions may be used by the respective person and whether corresponding personalized settings of parameters of the functions are present. The vehicle operating system can then activate the corresponding individual functional scope allocated to the respective person and thus make possible an individually adjusted vehicle.

This is particularly advantageous when different people use one and the same vehicle or in particular as well when different people use different vehicles, for example when car sharing, such that, for example when opening the vehicle via a personalized key, which can be integrated in particular into a smartphone or a wearable, the corresponding functions allocated to this person are immediately available. Thus, an individual person can license different functions, for example, which they would like to have available in the vehicle. The same vehicle can then provide a completely different function and comfort scope for the one person as for the other person, which is rather economical and could avoid the licensing of additional comfort functions.

The functions or applications in the function memory of the vehicle operating system can comprise different kinds of functions, for example navigation functions, autonomous vehicle functions, comfort functions, such as the setting of seats, mirrors, heating or similar, and multimedia functions, via which volume, preferred radio station etc., for example, can be chosen in advance. Along with this, further functions for the vehicle operation are conceivable, for example user-adapted switching programs in order to drive with the vehicle depending on user prerequisites and wishes.

According to a particularly favorable design of the vehicle operating system according to the invention, the functions can now comprise light functions, in particular. To do so, it is correspondingly provided that the functions for emitting control commands to a headlight controller are formed. Such light functions, such as are mentioned, for example in DE 10 2016 008 981 A1, can be functions, in particular, such as partial full beam or similar that can be correspondingly realized with high-resolution pixel headlights. Above all, such a functionality enabling a great advantage for the client, can be a main application aspect for such an open interface. Here, different providers can develop and provide illumination concepts concurrently. A quick development in this field guarantees a very quick implementation of new functions in vehicles having such open interfaces. In doing so, based on the overall traffic, a high degree of safety is possible since innovative illumination concepts are available very quickly to many people, and elaborate functionalities in terms of partial full beam, curved lights and similar evidently lead to an increase in driving safety. On one hand, vision is increased and, on the other hand, the danger of dazzling the oncoming traffic is correspondingly reduced. This kind of function lends itself as the preferred application. Moreover, it provides a field of application in which the danger of misuse is relatively small since no immediate danger to the user of the vehicle emerges from a potential misuse and since this is fairly easily for the user of the vehicle to recognize.

Along with a personalization of comfort settings and similar, this application thus constitutes a particularly favorable and efficient use for the operating system according to the invention.

The method according to the invention for operating a vehicle operating system can now interact, in particular, with an operating system in the sense described above, yet is not necessarily assigned to it. With the method according to the invention, it is provided that functions or applications are loaded into the vehicle operating system, which carry out control functions in the vehicle based on data of a data interface by them sending control commands to a vehicle interface. Here, the interfaces can again be available as open correspondingly documented interfaces, as already mentioned above, in order to thus enable a development of functions and applications not only by the vehicle manufacturer, but rather also by third parties in the positive sense as described above. The method according to the invention, much like the vehicle operating system according to the invention, delimits the value range of the control commands to a respectively permissible value range, on the part of the vehicle, in order to thus prevent a misuse or an erroneous function and to be able to guarantee the safety of the vehicle.

Here, according to an advantageous development, the method provides that the data interface provides data according to predetermined models for sensor fusions, which are subject to the control of the vehicle manufacturer. The sensor data is thus merged, in particular according to predetermined models, which are correspondingly adjusted and can be changed as necessary, and, in this way, is available. With an open interface, this is correspondingly documented. Here, there can be fusion models, for example, for merging the sensor data, which are tailored to illumination functions, in particular, i.e., require data detected by the surroundings sensors of the vehicle, for example about other road users coming ahead, behind or in the opposite direction. Other functions and applications, which do not require this complex data, can correspondingly enable data of alternative models of the sensor fusion in order to thus provide settings, for example, relating to the desired temperature or a heating or air conditioning system, the currently set volume of a multimedia device or similar.

A very advantageous development of the method according to the invention here provides that the functions and applications are compiled by the vehicle manufacturer or third party providers. They can then be loaded into the vehicle operating system or its function memory via a backend server and correspondingly used. Thus, third party suppliers can develop and provide suitable functions, on one hand via the open interfaces in the form of the data interface and, on the other hand, the control interface. The user can then load these into their operating system via a backend server of the vehicle manufacturer or the vehicle manufacturer can automatically load updates to existing functions into the operating system when a connection to the backend server exists via the communication module.

A very advantageous development of the method according to the invention further provides that the enabling of loaded functions or applications is carried out by means of user data and/or depending on data specific to the vehicle. The functions and applications present in the function memory are thus adjusted and enabled corresponding to user data, for example from the personalization memory mentioned above. Thus, a user can have more functions available in one and the same vehicle, for example, because they have licensed more functions, than another user, for example, who can use fewer functions in the same vehicle. Moreover, certain functions can only be carried out in a limited manner or, where necessary, not at all by certain vehicles. If a user uses different vehicles, for example, and has licensed different functions, then it can now be that not all functions function in all vehicles. Vehicle-specific data is therefore also taken into consideration when enabling. For example, if the user has loaded autonomous driving functions and uses these regularly in their first vehicle, then it can be that their second vehicle does not have all necessary sensors of the surroundings detection system available, such as stereo cameras, lidars or similar, since, for example, the vehicle is a vehicle of a smaller vehicle class or since this vehicle is somewhat older. The corresponding functions can then be disabled as technically non-executable, even if the user could, in principle, use these because of a valid license.

According to an advantageous development of the method according to the invention, a payment function is integrated into the interface between the communication module and the backend server. Such a payment function makes it exceptionally easily possible to obtain an update or to license or buy additional functions or applications subject to license. As a result of the integrated payment function, the payment can also be processed when downloading the corresponding functions or applications into the vehicle, such that an exceptionally simple system that is efficient to use emerges.

Here, the functions can comprise vehicle-specific basic functions and, in particular, advanced functions or applications allocated to a user. The basic functions for the vehicle are typically correspondingly programmed by the vehicle manufacturer, for example upon its delivery. Here, further updates can also be carried out during the operating duration of the vehicle. The advanced features, which are preferably no longer allocated to the vehicle, but rather now to a user, are practically functions of "special equipment". These functions can be correspondingly purchased by the user, for example from the vehicle manufacturer or also from any other third party suppliers. Via this, the user can adjust the vehicle to their individual requirements and can profit from quicker development cycles as a result of the incorporation of third party suppliers. For example, they can thus also enhance an older vehicle, provided that this is technically possibly and relates to their sensor data, with newer functions, or similar.

These advanced functions or applications can now be loaded into the vehicle via the communication module depending on the respective user of the vehicle. As has already been mentioned above, such an allocation carried out to the user of the functions makes it possible for the user to be able to use different vehicles with the functions used and, in particular, purchased or licensed by them, and the function and application surroundings always take place in the same manner. In particular when using vehicles by different people, for example when car sharing or also when using a fleet of company cars, this can have a very decisive advantageous, since each user finds their known surroundings in each vehicle, regardless of who has driven the vehicle before them and, provided that no limitations as a result of the available sensors emerge her in the vehicle, also independently of the type of the vehicle itself.

Here, a very advantageous design of the idea furthermore provides that vehicle data is anonymously transmitted to the backend server via the communication module depending on user approval and is processed in the backend sever. In doing so, vehicle data can be collected in the backend server and can be used for the development of functionalities, for example. This data can then also be provided by functions, for example, via the backend sever and a suitable interface to third party suppliers as well. The availability of such data to the authorities, for example, who can use this for statistical purposes and for planning traffic projects, is also conceivable. By way of example, a further application scenario would be the provision of such data, preferably for money, to commercial companies, such as insurance companies, for example, or similar, who can calculate type classes, regional classes or similar based on this with higher statistical reliability and can provide the thus possible adjusted insurance tariffs to their customers.

BRIEF DESCRIPTION OF THE DRAWING FIGURES

Further advantageous designs of the vehicle operating system and the method emerge from the exemplary embodiment described in more detail below with reference to the figures.

Figure 2:
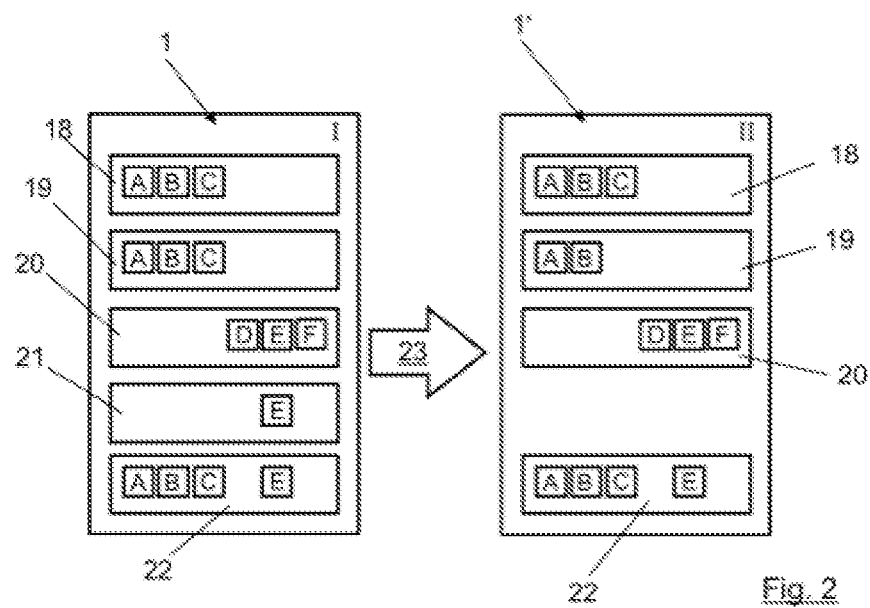
Figure 3:
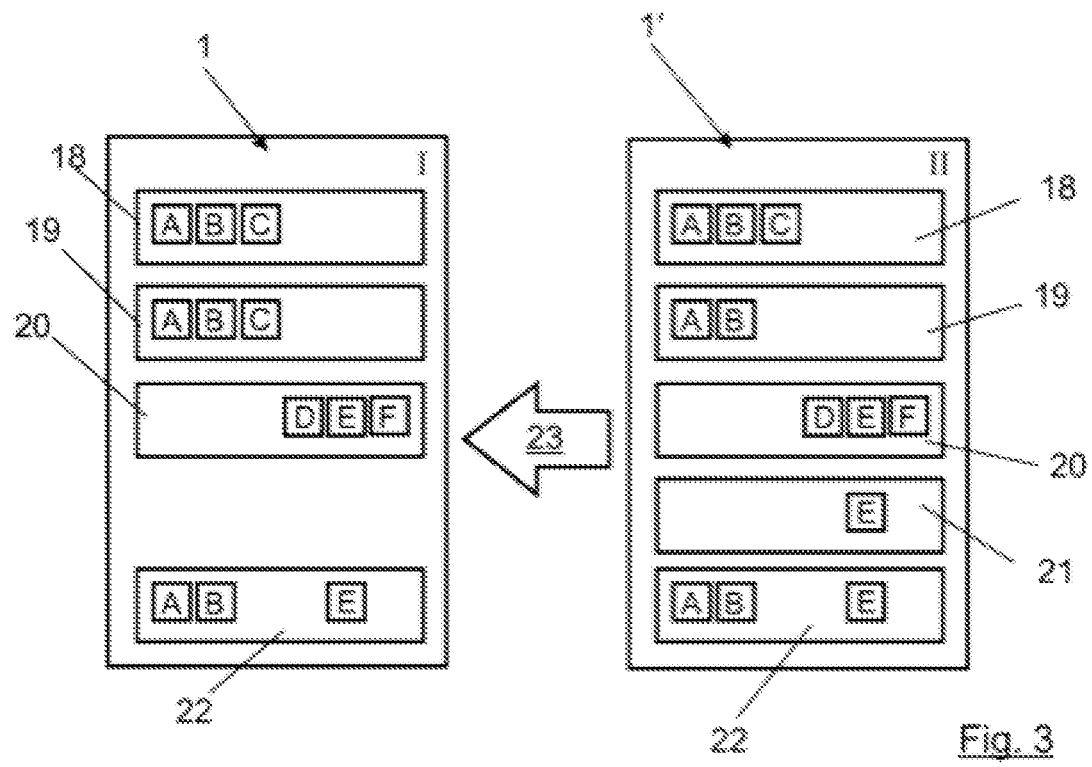

Here are shown:

FIG. 1 schematic depiction of a vehicle, a vehicle operating system and the interfaces necessary and meaningful for the method according to the invention;

FIG. 2 schematic depiction of the situation when a user changes from a vehicle of the vehicle class Ito a vehicle of the vehicle class II;

FIG. 3 the reversed scenario to the depiction in FIG. 2; and

Figure 4:
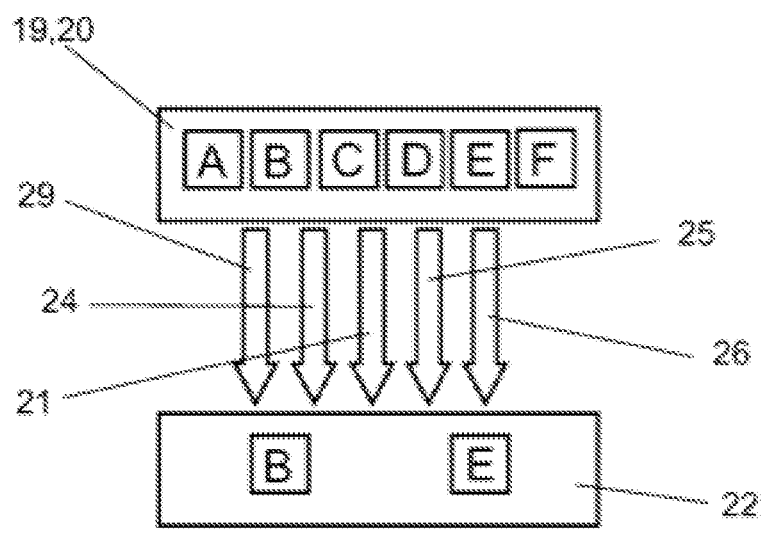

FIG. 4 schematic depiction for checking the functional scope depending on vehicle-specific data.

DETAILED DESCRIPTION

In the depiction of the FIG. 1, a schematically indicated vehicle 1 is depicted, having a vehicle operating system 2. Part of this vehicle operating system 2 is a function memory 3 for storing functions or applications, which are labelled here by way of example with A to F. The function memory 3 is connected to an interface 4 as a data interface for emitting sensor data, which comes from a sensor function 5. A further interface 6 serves for emitting control commands to a vehicle gateway 7, such that corresponding actuators of the vehicle correspondingly implement the control commands of the functions or applications A to F. Here, a memory labelled with 8 is decisive for the permissible range of values of the control commands emitted via the interface 6. The vehicle operating system 2 obtains the corresponding permissible ranges of values from the memory 8. Should these not be satisfied by the function A to F, then they are limited to the permissible range of values via the vehicle operating system 2, such that the permissible range of values cannot be exceeded either because of a programming error or incorrectly.

A communication module 9 is available to the vehicle 1. It can be used, in particular via the path labelled with 10, to download new functions by it communicating bidirectionally with a backend server 11, preferably a backend server of the vehicle manufacturer. The operating system 2 can moreover provide vehicle data for the backend server via an upload, labelled with 12, via the communication module 9, the data there being able to be used for developing functions or applications A to F, for example, for the purposes of statistics or similar. To do so, the backend server 11 has an interface labelled with 13, via which such anonymous vehicle data can be sold to commercial users, for example, or can be available to the authorities. Via a further interface labelled with 14, the backend server 11 obtains new functions, functional modules, updates or applications A to F, which can be loaded into the function memory 3 of the operating system 2 via the backend server and the communication module 9 as a download 10. As needed, new fusion models can also be initiated via the backend server 11. These can be downloaded to the vehicle via the communication module 9 and are provided to the sensor function 5 via the path labelled with 15, the sensor function then also alternatively providing the data via the interface 4 according to this new fusion model or in addition to the previous function models. Moreover, a schematically indicated payment function 27 can be integrated into the data interface between the communication module 9 and the backend server 11 in order to thus be able to directly download functions or applications A to F subject to a charge, for example, and to pay for them.

In addition, a personalization memory 16 is available, which is connected to the function memory 3, on one hand, and at least indirectly, for example via a user interface 17, to the vehicle operating system 2, on the other hand. Via this personalization memory 16, different functionalities can be accessed by the vehicle operating system 2, for example which functions or applications A to F (i.e., a set of functions or applications A to F) are allocated to a certain person (i.e., a subset of the set of functions or applications A to F) and therefore, when this person uses the vehicle 1, which functions are to be enabled. Information about the licensing of individual functions A to F in order to not accidentally provide these to people who have not licensed or bought these can be correspondingly stored in the personalization memory 16.

An essential component is now that the interface 4 is conceptualized as a defined open interface, whereby there is the possibility of portioning the functions and applications A to F. The open interface, as the data interface 4, substantially provides the merged sensor data from the sensor function 5. Then, via the interface 6, the emission of the control commands is carried out to the vehicle gateway 7 and thus to the actuators of the vehicle, wherein this is monitored in a range of values defined by the vehicle manufacturer and stored by the vehicle operating system 2 in the memory 8, in order to preclude the danger of improper use or accidental erroneous programming. The preferred application already mentioned at the start of at least one of the functions A to F for controlling a headlight 30, in particular a high definition pixel headlight, for generating an individually adjusted beam pattern, is here also indicated in the depiction of FIG. 1. To do so, the vehicle gateway 7 is connected to a headlight device 28, which correspondingly controls the indicated headlight 30 of the vehicle 1.

Via the communication module 9, for example a GSM module, the vehicle 1 is moreover correspondingly coupled to the backend server 11, such that newly developed functions A to F, for example light functions for controlling the headlight control device 28, can be quickly loaded onto the vehicle 1 or into its function memory 3. In addition, personalized settings can be correspondingly transferred via the backend server 11 in order to be able to thus respectively individually adjust different vehicles to the same user or one vehicle to different users.

The shaded blocks in the depiction of FIG. 1 are here liable to the scope of responsibility of the vehicle manufacturer. They are thus responsible for the communication module 9, the sensor fusion 5, the backend server 11, for example, and, in particular, for the memory 8 and the vehicle gateway 7, the personalization memory 16, the user interface 17 and, furthermore, the operating system 2 of the vehicle 1, even if this is not highlighted with shading.

The quality of the functions and applications A to F supplied here substantially depends on the quality of the sensor fusion 5. Therefore, this block is also further developed by the vehicle manufacturer and, as part of a documentation, provides the open interfaces 4, 6. As already mentioned, here a fixedly defined range of values for every conceivable control command, which is also part of the documentation of the open interfaces 4 and 6, is stored in the memory 8. Satisfying these is monitored by the vehicle operating system 2 in order to be able to safely preclude erroneous functions. Otherwise, the use of the open interfaces 4, 6 allows for the individual functions and applications A to F to not necessarily have to be developed exclusively by the vehicle manufacturer, but instead for third party suppliers to also be able to provide such functions A to F. This has the advantage that new functions and applications A to F can be provided by subcontractors, for example, by subsidiary companies or specialized software companies. These do not necessarily have to come from the automotive industry, since the sensor data can in fact already be present as merged from the sensor fusion 5 in a predefined manner to the interface 4. Thus, a very high degree of flexibility is created. New and very complex functions and applications A to F can be supplied by the respective software specialists, for example for different vehicle users, not as contractually obliged service providers but as independent service companies. In doing so, a very quick development cycle is possible, and new functions and applications A to F can very quickly be provided to the user of the vehicle 1 as the end client.

Here, by means of the open interfaces 4, 6, information about the upload 12 to the backend server 11 can be uploaded by the functions or applications A to F. The backend server 11 can then provide this data via the already addressed defined interface 13. This makes it possible, for example, that anonymous data can be issued to the authorities or traffic institutes for statistical purposes, which, for example with the preferred use of light functionalities, are then able to evaluate how often and for how long dazzle-free full-beam was activated. This can also be used as a basis in order to undertake future improvements to the functions and applications A to F. The access to the interface 13 can here be controlled by the vehicle manufacturer, such that the data becomes available to different user groups, for example for corresponding payment, in a different scope.

Furthermore, it is also possible that new functions or applications A to F and, where necessary, a request relating to new sensor fusion models are compiled and transmitted to the vehicle manufacturer. Different third party companies here certainly have different interests. Some companies are interested in providing functions or applications A to F to the user of the vehicle, for example selling or licensing them, that control the functions in the vehicle. For example, suppliers of multimedia equipment which is installed in the vehicle can also provide corresponding applications or functions A to F which interact directly with the system of the vehicle supplied by them. Other companies are interested in providing improvements, for example improved full-beam functions, in order to provide these to the driver for payment and to make it possible for the driver to drive more comfortably and safely at night. Other companies, different again, can also be primarily interested in the data of the vehicle 1, for example. An insurance company might want to have access to speed data, for example. To do so, the user of the vehicle can correspondingly install a function or application A to F of the insurance company via the backend server 11 and the communication module 9. The insurance company can then in turn request data exchanged between the function or application A to F and the backend 11 via the interface 13 and can statistically evaluate type classes, regional classes or similar on this basis. With the corresponding agreement of the vehicle owner, data relating to the person or relating to the vehicle, such as speed profiles or similar, for example, can also be recorded, for example, in order to thus influence the insurance premiums which are to be paid by the vehicle user. This can be advantageous with a driver with a primarily defensive driving manner, such that they can profit from a cheaper insurance tariff.

A further aspect here provides that the functions A to F, in particular, are divided into basic functions, for example A, B, C, and enhanced functions or applications, for example D, E, F. The basic functions are already included when the vehicle 1 is delivered. Said functions can be downloaded and accessed by a corresponding license, for example, or purchased.

Via the coupling of the vehicle 1 via the communication module 9 to the backend server 11 and, in particular, via the possibility of personalization, for which the personalization memory 16 can eventually be used, it is possible that the functions and applications A to F are allocated to one user. This means that they can use these functions and applications A to F not only in one, but rather in various vehicles, such that, in effect, they discover their personal vehicle surroundings and always the same functions and applications A to F in every vehicle, provided that the vehicle is able to implement them. A preferred application can here be company cars or vehicles for car-sharing.

FIG. 2 illustrates two vehicles 1 and 1'. The vehicle 1 belongs to a first vehicle class I and the second vehicle 1' to a second vehicle class II. The basic equipment for the basic functions A, B, C, which are loaded into the function memory 3 when the vehicle is delivered, is in the field labelled 18. The vehicle 1 in the vehicle class I here has enabled all three functions A, B, C corresponding to the box labelled 19. The enabling 19 with the vehicle 1' of vehicle class II only includes the functions A and B, such that only these functions can be correspondingly used. In both cases, it is so that the enhanced functions and applications D, E, F have been downloaded via a retrospective download 20 in both vehicles 1, 1'. The user of the vehicle 1 of the vehicle class I has now additionally licensed the function E, as is indicated in the box labelled with 21. If they use vehicle 1, the functions A, B, C and E are now available to them. This is correspondingly indicated by the box labelled 22. If a user of the vehicle 1 of vehicle class I now changes the vehicle, as symbolized by the arrow 23, and now uses the vehicle 1' of the vehicle class II, then the same functions in the basic equipment 18 and in the download 20 are available in this vehicle. In box 22, they can thus have the same functions A, B in addition to the basic functions C, which is typically not available in the vehicle of type class II, and the function E licensed by them. The user thus has "their" functions A, B, C and E available, independent of the vehicle, provided that the vehicle is technically capable of implementing the respective functions.

FIG. 3 illustrates the opposite scenario. This time, we see the driver or user of the vehicle 1' of the vehicle type class II. They have also additionally licensed the function E, otherwise the scenario is the same as in the depiction of FIG. 3. With the vehicle 1' of the type class II, only the basic functions A and B are available. Moreover, the user has the function E licensed by them available to them. If they now change into a vehicle of the vehicle class I, more basic functions would be available, in principle, as is correspondingly indicated in box 19. Yet since they use the vehicle 1 of the vehicle class I as a registered user of vehicle class II, only functions A, B and E are available to them, as they are correspondingly used to these from their vehicle.

Whether a function or application A to F is thus actually available and enabled for the user of a vehicle 1, 1', does not depend, as before, on the vehicle 1, 1', but rather on the user themselves. Whether now all the functionalities desired by the user and appertaining to them can also actually be used, nevertheless also depends on further parameters, which are summarized in the sense of the present application under the concept of vehicle-specific parameters.

In FIG. 4, the upper box labelled with 19, 20 shows all principally available functions and applications A to F that are correspondingly present in the vehicle or have been downloaded, analogously to the scenarios in FIGS. 2 and 3. A user could thus have all functions A to F. Whether they can actually have them or not also depends on the vehicle-specific conditions, along with their licenses. In a first arrow labelled with 29, it is checked whether the hardware of the vehicle 1, 1' is able to constitute all the functions. The arrow labelled with 24 checks a corresponding local functionality as to whether the corresponding function A to F, for example, is permissible in the respective country where the vehicle is. A further aspect relates to the licensing. If the user has not licensed all available functions, as is indicated via the arrow labelled 21 analogously to the licensing in FIGS. 2 and 3, certain functions, in the example of FIGS. 2 and 3, for example, functions D and F, are not available to them for this reason. Via the arrow 25 it is requested whether the corresponding functionality is stored in the user interface 17 or the personalization memory 16 for the corresponding user. In the final arrow labelled with 26, it is then checked whether the available sensor data and thus, in effect, the quality of the available sensor data permits a use of the corresponding function A to F. Thus, for example with correspondingly poor weather conditions, certain functionalities can or cannot be used to their full extent, for example functionalities of automatic driving or other functionalities that also depend on the surrounding conditions, such as the weather or similar, in terms of the quality of the recorded sensor data.

If all these points are checked, different functions and applications A to F are available to the user, analogously to the depiction in FIGS. 2 and 3. Here, this is also again correspondingly indicated in the box labelled with 22. In the exemplary embodiment depicted here, only the functions B and E are available because the function C, for example, is not available to the respective user, analogously to the scenario in FIG. 3, because the functions D and F have not been licensed and because the function A may not or cannot be made available, for example because of local regulations or insufficient quality of sensor data.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:
1. A vehicle operating system for a vehicle, comprising:
a function memory storing functions or applications;
a first interface configured to emit set sensor data to the functions or applications;
a second interface configured to forward control commands generated by the functions or applications to actuators of the vehicle; and
a memory storing permissible value ranges set for the control commands for the vehicle;
a communication module configured to connect at least the function memory to a backend server; and a personalisation memory, connected to the function memory and the communication module, storing which of the functions or applications are available to a user of the vehicle, wherein whether at least one of the functions or applications is available to the user of the vehicle depends on whether the user has a license for the at least one of the functions or applications, wherein the second interface is configured to forward the control commands having values within the permissible value ranges stored in the memory storing permissible value ranges.

2. The vehicle operating system of claim 1, wherein at least one of the functions emits control commands to a headlight controller of the vehicle.

3. A method for operating a vehicle operating system of a vehicle, the method comprising:

identifying a user of the vehicle;

selecting, based on the identifying of the user of the vehicle, a subset of functions or applications from a plurality of functions or applications, wherein at least one function or application of the subset of functions or applications is only selected for the user of the vehicle when the user of the vehicle has a license for the at least one function or application;

loading the subset of functions or applications into a function memory of the vehicle, sending control commands, via an interface to the vehicle, by the functions or applications to perform control functions in the vehicle based on data of a data interface; and limiting, by the vehicle, a value range of the sent control commands to a permissible value range for the vehicle, wherein the functions and applications are compiled by a manufacturer of the vehicle or by third party providers, and wherein the functions and applications are loaded into the function memory of the vehicle operating system via a backend server and a communication module of the vehicle.

4. The method of claim 3, wherein enabling the loaded functions or applications depending upon user data or vehicle-specific data.

5. The method of claim 3, wherein a payment function is integrated into an interface between the communication module and the backend server.

6. The method of claim 3, wherein the functions or applications comprise:

vehicle-specific basic functions; and advanced functions or applications allocated to a user of the vehicle.

7. The method of claim 6, wherein the advanced functions or applications are loaded, via the communication module, into the vehicle depending on the user of the vehicle.

8. The method of claim 3, wherein vehicle data is transmitted to the backend server depending on a user agreement anonymously via the communication module and is processed in the backend server.

9. The method of claim 3, wherein the selecting of the subset of functions or applications comprises selecting at least one additional function or application of the subset of functions or applications, wherein the at least one additional function or application of the subset of functions or applications is available to the user in another vehicle.

10. The method of claim 9, wherein the at least one additional function or application of the subset of functions or applications is not present in the vehicle, the method further comprising:

downloading, by the vehicle, the at least one additional function or application of the subset of functions or applications.

11. The method of claim 9, wherein the plurality of functions or applications includes a further function or application that is not present in another vehicle used by the user, and wherein the further function or application is not selected as part of the subset of functions or applications.

* * * * *